United States Patent
Okamoto et al.

(10) Patent No.: US 6,430,475 B2
(45) Date of Patent: Aug. 6, 2002

(54) PRESSURE-DISTRIBUTION SENSOR FOR CONTROLLING MULTI-JOINTED NURSING ROBOT

(75) Inventors: Osamu Okamoto, Tachikawa; Teruomi Nakaya, Machida; Heihachiro Kamimura, Mitaka; Isao Yamaguchi, Tokorozawa; Seizo Suzuki, Tokyo; Kazuyoshi Yabuuchi, Amagasaki; Jyunichi Ueno; Yasuoki Usui, both of Sanda; Hiroaki Nagano, Itami; Katsuhiko Renbutsu, Takarazuka; Mitsuharu Izaki, Kawanishi, all of (JP)

(73) Assignee: National Aerospace Laboratory of Japan, Chofu (JP)

( * ) Notice: Subject to any disclaimer, the term of this patent is extended or adjusted under 35 U.S.C. 154(b) by 0 days.

(21) Appl. No.: 09/828,988

(22) Filed: Apr. 10, 2001

(30) Foreign Application Priority Data

Apr. 10, 2000 (JP) ........................................ 2000-108346

(51) Int. Cl.$^7$ .............................................. G06F 19/00
(52) U.S. Cl. ...................... 700/245; 700/247; 700/258; 73/172; 73/862.046; 73/856.7; 318/568.11; 318/568.12; 318/568.19; 318/687; 901/28; 901/46
(58) Field of Search .............................. 700/245, 247, 700/258; 73/172, 862.046, 856.7, 862.043; 901/46, 28; 338/114, 99; 318/568.11, 568.19, 687, 568.12

(56) References Cited

U.S. PATENT DOCUMENTS 5,010,774 A * 4/1991 Kikuo et al. ............ 73/862.046
5,799,533 A * 9/1998 Seki et al. ............... 73/862.046

FOREIGN PATENT DOCUMENTS

JP          63058121 A   *   3/1988

OTHER PUBLICATIONS

Entran Capteurs & Electroniques, Pressure sensors, 2001, Internet.*
Ryew et al., double active universal join (DAUJ): Robotic joint mechanism for humanlike motions, 2001, IEEE, pp. 290–300.*
Osamu Okamoto et al.; The 9$^{th}$ Convention of Institute of Computer aided Surgery, Japan, Oct. 31, 2000.

* cited by examiner

Primary Examiner—William A. Cuchlinski, Jr.
Assistant Examiner—McDieunel Marc
(74) Attorney, Agent, or Firm—Armstrong, Westerman & Hattori, LLP

(57) ABSTRACT

The present invention provides contact sensors capable of determining the pressure distribution over the whole surface of each of joint units having a cylindrical shape, both end portions of which are cut at an offset angle, and constituting robot arms. In order to provide a technology enabling real-time drive control of the robot arms by using detected values from these sensors, the points of intersection of the electrodes are distributed across the whole surface of each joint by forming a pressure-sensitive sheet sensor in which column electrodes arranged in parallel, and row electrodes arranged in a wound-string shape, are combined, these joints having a cylindrical shape, both end portions of which are cut at an offset angle. In addition, by making an electrode structure that covers a prescribed width in both rows and columns, the number of signal output terminals is reduced and the operation processing load is lightened. Moreover, after executing local processing, through the use of an encoder and pressure-sensitive sheet sensor provided in each of the joints, in addition to the information processing means, [this data] is sent to the CPU, whereby the central operation processing load is lightened.

4 Claims, 6 Drawing Sheets

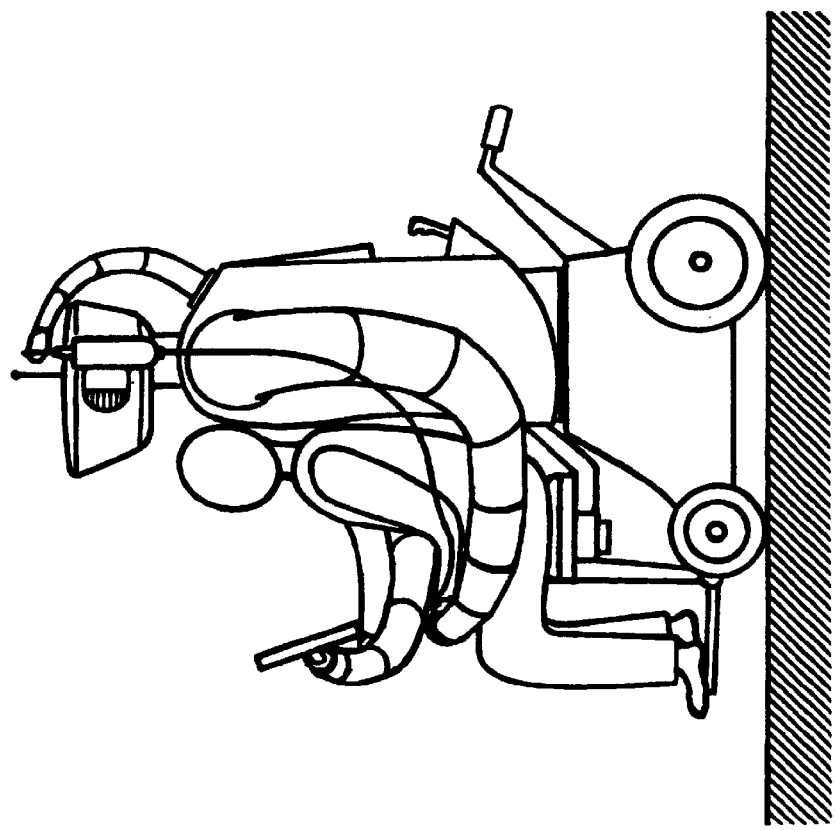
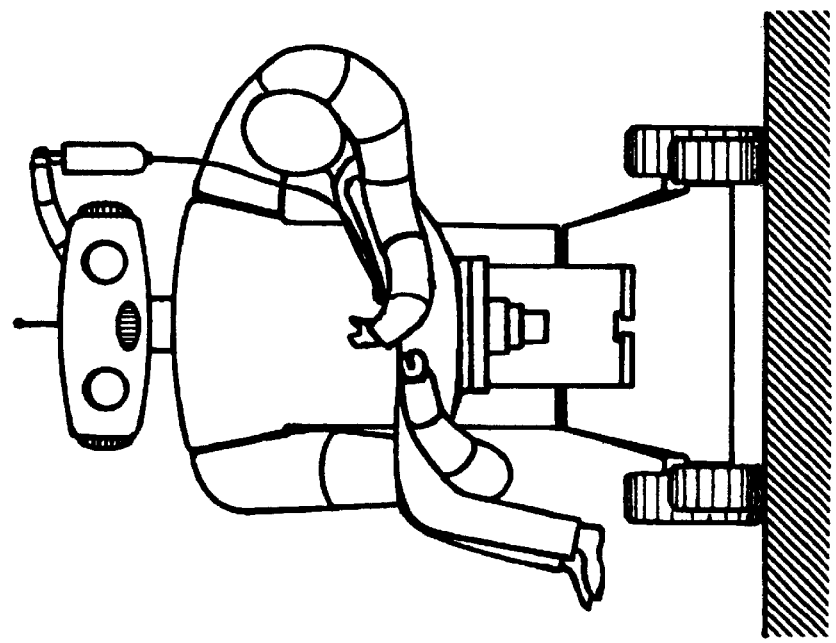
Fig.1-A
Fig.1-B

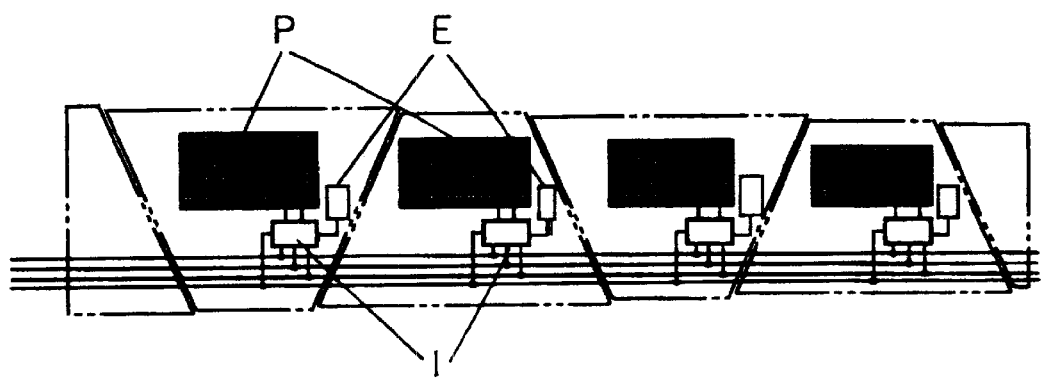
Fig. 2-A
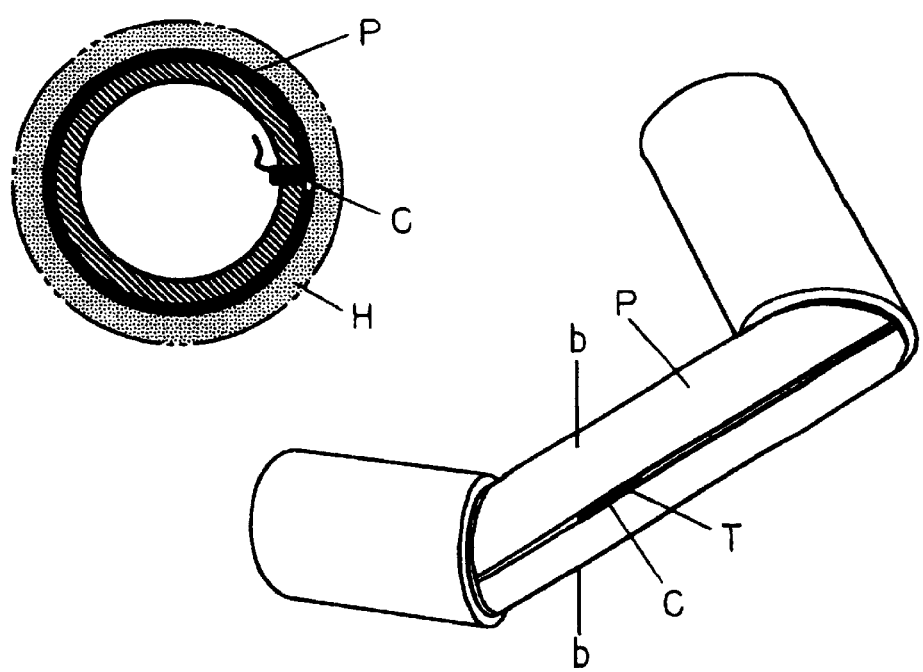
Fig. 2-B
Fig. 2-C

Fig. 3-A
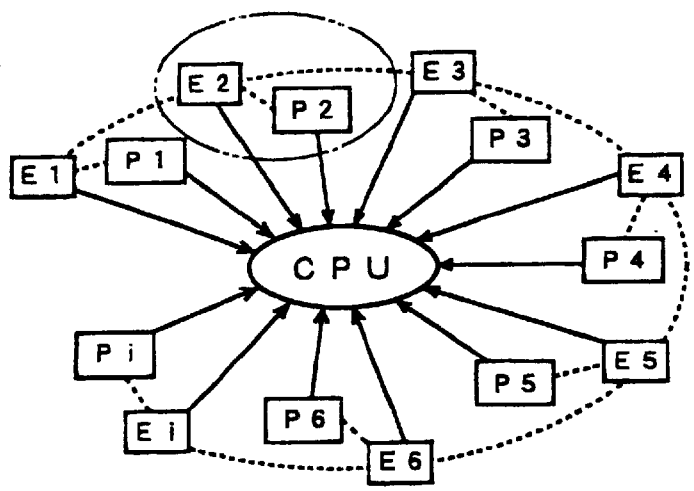
Fig. 3-B
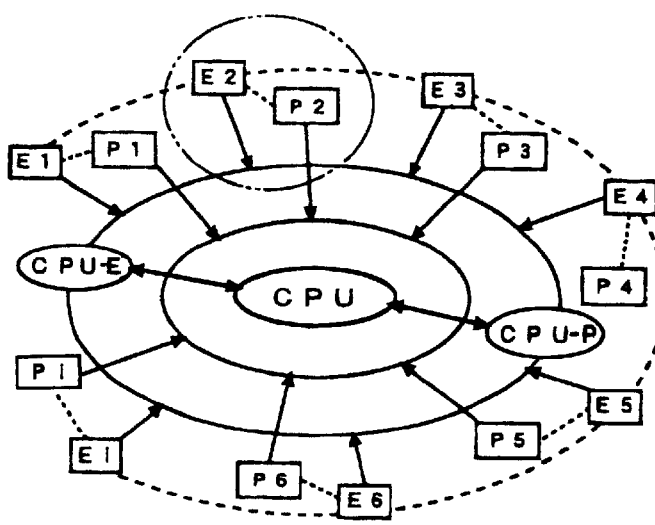
Fig. 3-C
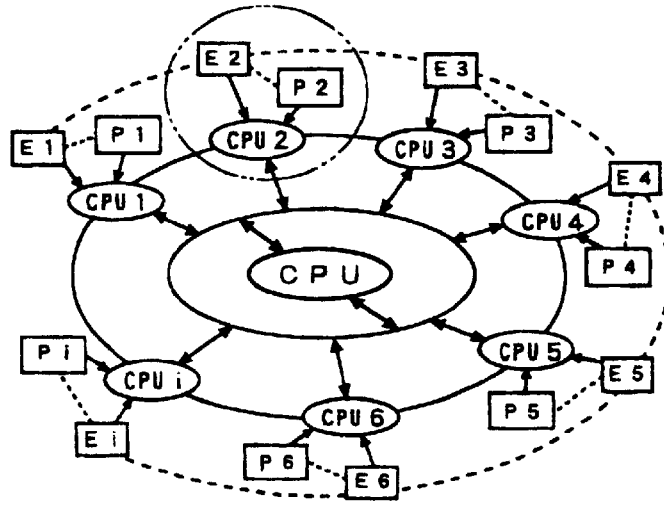

Fig. 4 - A
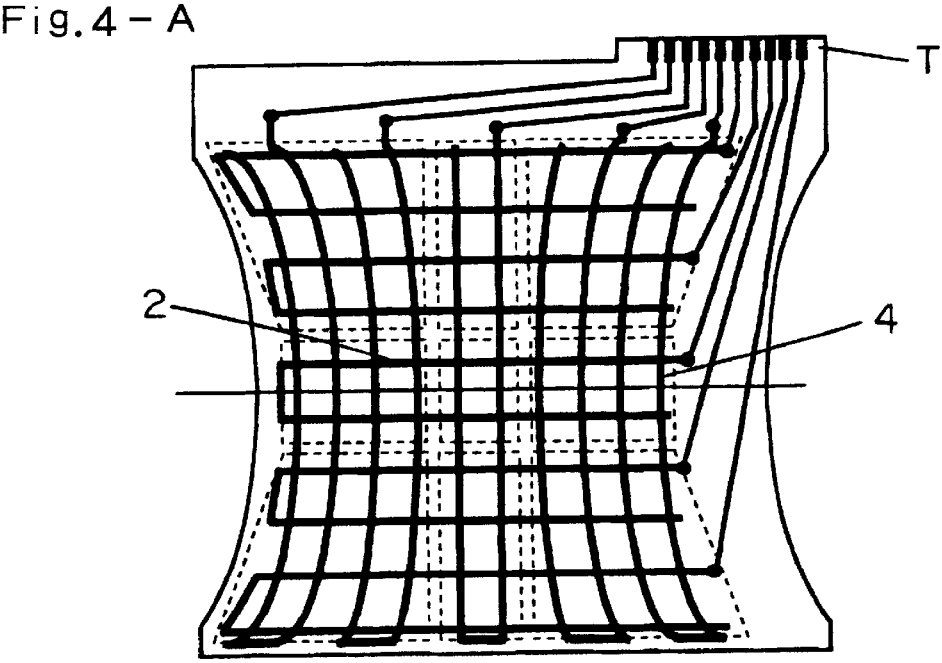
Fig. 4 - B
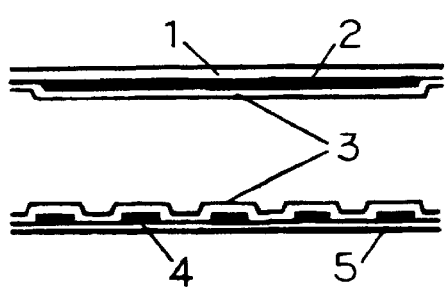
Fig. 4 - C
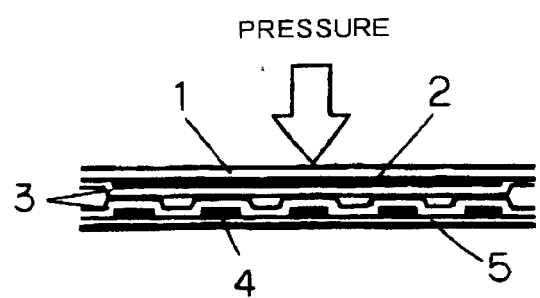

Fig. 5-A
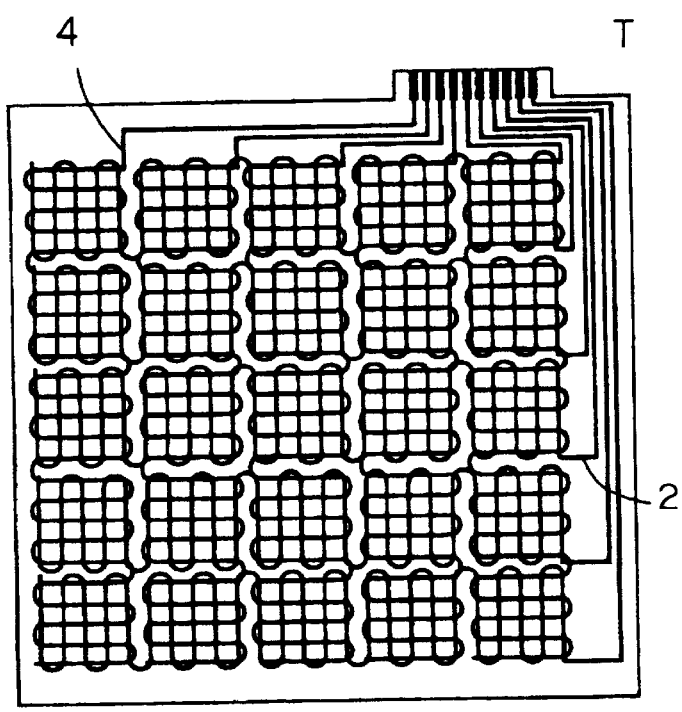
Fig. 5-B
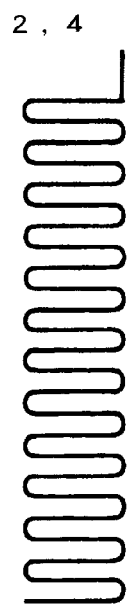
Fig. 6-A
PRESSURE-
SENSITIVE
MATRIX
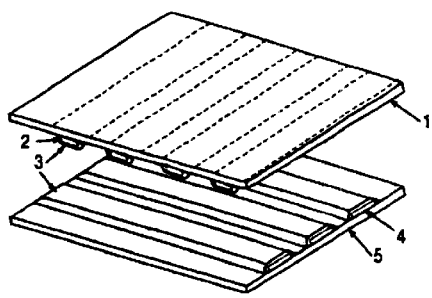
Fig. 6-B

PRESSURE-DISTRIBUTION SENSOR FOR CONTROLLING MULTI-JOINTED NURSING ROBOT

BACKGROUND OF THE INVENTION

1. Field of the Invention

The present invention relates to a robot to assist with the nursing of the elderly and so on, and more particularly to a sensor, and peripheral technology thereof, for detecting the pressure distribution, such as that in multi-jointed arms, and for use in the drive-control of the robot.

2. Description of the Related Art

In an aging society, while nursing of the elderly and so forth is of increasing importance, it is physically demanding for those undertaking the nursing and there are frequent cases of the caregivers themselves sustaining injuries to hips, knees, shoulders, arms and so forth. Such situations have given rise to intensive research and development of means to help with nursing. The advent of nursing robots is also eagerly anticipated but has not yet reached the practical stage. Unlike industrial robots, since such robots are intended for human beings and the physically weak, the movements of such robots must not only be sufficiently safe and reliable, but also delicate, so as to provide those receiving care with a sense of security. In other words, since people require gentle care, the provision of a nursing robot poses tremendous -difficulties in terms of the control and the mechanics involved.

The present inventors initially researched and developed a "Rotary articulated robot and method of control thereof", this robot having a construction in which offset joints and rotating joints were integrated, and a Japanese Patent Application was filed (H 11-319334), which corresponds to U.S. patent application Ser. No. 09/708,667. In a multi-jointed robot having a plurality of offset-rotation joints by which the drive-side arm and driven-side arm are rotatably driven about an offset-rotation axis inclined with respect to the arm axis, the multi-jointed robot of this invention is characterized by allowing a hollow rotating shaft to rotate freely, this hollow rotating shaft being inclined by a prescribed offset angle and driven by a motor in the tip of either the drive-side arm or driven-side arm, and characterized by a rotor member being fixed that transmits a rotation force from the abovementioned hollow shaft to the base end of the other arm, and by the abovementioned hollow rotating shaft and abovementioned rotor member constituting a mechanism permitting high deceleration ratio transmission and an increase in torque. With this construction, even smaller drive motors are employed, greater rotational torque can be transmitted, highly precise positioning is possible, and a very lightweight joint with offset rotation at a higher torque is obtained. By virtue of the fact that this offset-rotation joint is linked at many points, it was possible to provide a highly functional multi-jointed robot capable of a wide range of complicated and precise movements with a high payload.

The basic construction of an offset-rotation joint in this multi-jointed robot is shown in FIG. 7. This figure shows the case where the cylindrical hand-base arm is the drive-side arm 6 and the hand-end arm is the driven-side arm 7, and depicts a state in which the driven-side arm 7 is linked by an offset-rotation joint offset by an offset angle y with respect to the arm axis of drive-side arm 6. The tip of the arm main body 6a of drive-side arm 6 is an aperture that is at a night angle to the axis, the base end of the driven-side arm is an aperture that is inclined at an angle of inclination γ with respect to the arm axis, and an offset-rotation joint assembly body is created in the right-rotation joint assembly body in this embodiment is constructed by integrating a motor unit 8, a drive-side arm tip portion 6b fixed to the leading edge of this motor unit, and a joint rotation transmission mechanism 9 fixed to this drive-side arm tip portion. A right-angle aperture is created in the base end side of the drive-side arm tip portion 6b and an inclined aperture is created in the tip side thereof. The right-angle aperture receives the tip of the motor shaft, and the joint rotation transmission mechanism 9 is fixed to the inclined aperture. The motor unit 8 has a motor case 10 of the same diameter as the arm, and by integrating the top and bottom ends of this motor case, as shown in the figure, by linking these ends to the drive-side arm 6a and drive-side arm tip portion 6b, the motor case 10 itself comprises one part of the drive-side arm. The motor unit 8 comprises a motor 11 formed so as to be integral with the abovementioned motor case 10, an encoder E, slip ring 13, and rotation speedometer (not illustrated), and the motor shaft 14 is established in a position on the same axis as the arm axis or on a parallel axis. In a construction of this kind, when the motor 11 is in a driving condition, the cylinder shaft 21 rotates at a prescribed rotational speed via the external teeth bevel gear 17 and internal teeth bevel gear 24. Here, by making the diameter of the internal teeth bevel gear 24 large, the motor is able to decelerate according to the ratio of the gear diameters, and a large torque can be produced using very small motors. Furthermore, it is possible to obtain a large deceleration ratio with a harmonic gear mechanism inside joint rotation transmission mechanism 9, and obtain greater rotational torque using small motors. It is possible, through this rotational torque, to extend the driven-side arm 7 through a desired angle with respect to drive-side arm 6.

The present inventors considered applying the invention "Rotary articulated robot and method of control thereof", permitting the provision of a highly functional multi-jointed robot capable of a wide range of complicated and precise movements with a high payload, to the arms of a nursing robot, which pose tremendous difficulties in terms of the control and the mechanics involved because people require gentle care. As far as the arms of the nursing robot are concerned, not only is it essential that the arms be capable of handling the work easily, but the movements of these arms must also not cause a person in care any pain or discomfort. For example, if a movement is considered in which a person lying in bed is picked up by the robot, when particular locations of the robot's arms are subjected to concentrations of stress, these arms touch the person in care strongly in those locations, and the direct result is that the person is bruised by this strong use of force. Consequently, it is necessary for the arms of the nursing robot to deform and make movements to change to a state in which the person's body is supported uniformly, and for local concentrations of stress to be avoided. In other words, since it is required for the nursing robot to make movements according to an initial objective, while taking appropriate measures to the state of contact with the person in care, that changes from one moment to the next, it is necessary for the nursing robot to constantly detect the state of holding the person in care and perform control corresponding to this detected value. When attempting to employ the developed multi-jointed robot, developed by the present applicants, as a nursing robot, a sensor, for detecting the state of contact between the robot and the person in care, is of prime importance.

Conventionally, pressure-sensitive sheet sensors have been employed as means for detecting pressure distribution received in particular areas. Such a sensor is shown in FIG. 6 and is formed as a layered single sheet comprising column electrodes 2 arranged on a column electrode side substrate material sheet 1 composed of polyester film or the like, and row electrodes 4 arranged on a row electrode side substrate material sheet 5, a pressure-sensitive resistive raw material 3 being interposed there between. A pressure-sensitive resistive raw material 3 is interposed between specific row electrodes and specific column electrodes of this pressure-sensitive sheet sensor. Consequently, the resistance value between both sets of electrodes depends on the properties of the pressure-sensitive resistive raw material 3 and shows a value in accordance with the stress imparted to areas where both sets of electrodes intersect. Therefore, if resistance values between each row electrode and each column electrode are determined in order, it is possible to detect the pressure in each location of intersection. This pressure-sensitive sheet sensor is capable of detecting the magnitude of the pressure on specific areas that are covered and position information, in other words the pressure distribution received. This pressure-sensitive sheet sensor is employed in the detection of many kinds of pressure distribution such as the determination of the pressure distribution of a body in a bed, the pressure distribution on the surface of a vehicle seat, on a chair seat, on the sole of a foot, and so forth.

The present inventors employed this pressure-sensitive sheet sensor in a multi-jointed robot and tried testing this sensor as a sensor for detecting the state of contact of the nursing robot. However, since the shape adopted for each joint unit of the multi-jointed robot is not that of a simple cylinder, both end portions of which being cut at an offset angle, it is not possible to—detect pressure over the whole surface using a conventional square sheet of matrix electrodes. Further, a nursing robot necessitates real-time, situation-dependant drive control. However, it takes a considerably long time to obtain pressure distribution through operation processing using detected values in a number of locations of intersection between column electrodes and row electrodes, and to perform suitable drive control of each joint based on the contact information resulting from this processing. Consequently, the problem of being unable to achieve the required real-time drive control has become a pressing one.

SUMMARY OF THE INVENTION

An object of the present invention is to solve each of the abovementioned problems, in other words the task faced by the present invention is thus to solve the abovementioned problems, that is, to provide a contact sensor capable of determining the pressure distribution over the whole surface of each joint unit, these joint units having a cylindrical shape, both end portions of which are cut at an offset angle, and constituting robot arms, and to provide a technology enabling real-time drive control of the robot arms by using detected values from these sensors.

Therefore, according to the present invention, since the points of intersection of the electrodes are distributed over the whole surface of each joint unit by forming a pressure-sensitive sheet sensor in which column electrodes arranged in parallel and row electrodes arranged in a shape resembling that of wound string, hereinafter referred to as "a wound-string shape," are combined, these joints having a cylindrical shape, both end portions of which are formed as an aperture that is inclined at a prescribed angle and, in addition, since both the column and row electrodes are arranged so as to cover the prescribed width, the number of signal output terminals is reduced and the operation processing load is lightened. Moreover, after executing local processing of signals output from sensors in each of the joints through the use of a processing circuit provided in each of the joints, and sending this data to the central CPU, the total processing speed is raised.

BRIEF DESCRIPTION OF THE DRAWINGS

FIG. 1 is a diagram showing an image of the nursing robot of the present invention at work, A showing the subject being held in a sideways position, and B showing the subject being held in a forwards position in the lap of the robot.

FIG. 2 is a diagram showing the multiple joint mechanism of the present invention. A shows an overview of the way in which the multiple joints are interconnected and of the basic construction each of the joint units has. B is a cross-sectional view of a joint, and C is a perspective view showing the outer shell with one part cut away.

FIG. 3 is a diagram showing the network formed by each joint unit and the robot's central control CPU. A and B are examples given for reference, and C is the network of the invention.

FIG. 4 is a diagram showing one embodiment of the pressure-sensitive matrix sheet sensor of the present invention. A is a plan view thereof, B is an exploded, cross-sectional view and C is a cross-sectional view showing the pressure-sensitive matrix sheet sensor as it is manufactured.

FIG. 5 is a diagram showing another embodiment of the pressure-sensitive matrix sheet sensor of the present invention. A is a plan view thereof and B is a diagram showing the electrode structure.

FIG. 6 is a diagram of the structure of a pressure-sensitive matrix sheet sensor that is typically used. A is a divided, perspective view thereof, and B is a divided, cross-sectional view thereof.

DESCRIPTION OF THE PREFERRED EMBODIMENTS

Figure 7:
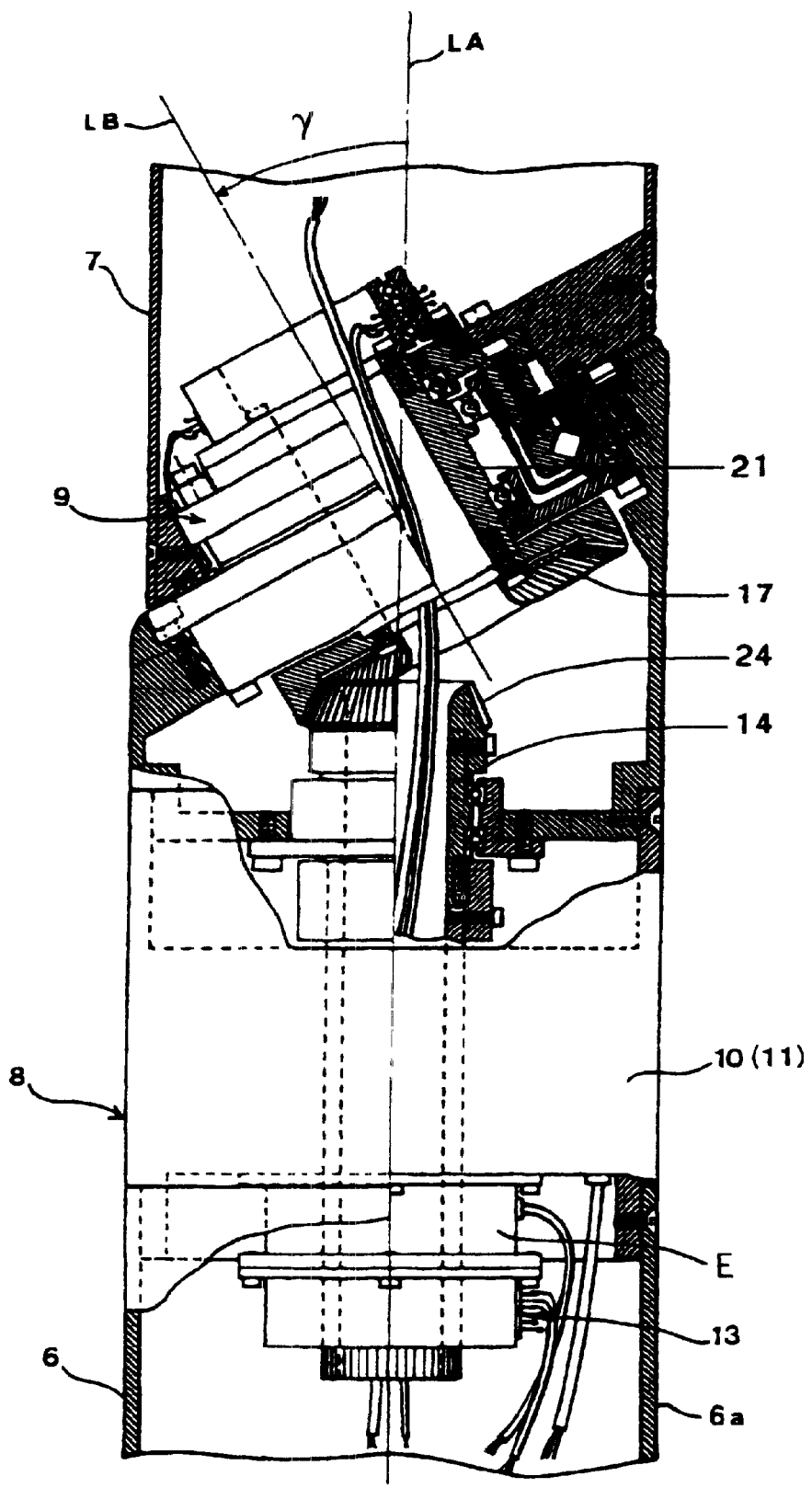
FIG. 7 is a diagram showing the structure of the offset rotating joints employed in the present invention.

The present invention will now be explained by reference to the drawings attached.

The nursing robot is as shown in FIG. 1, specifically, a push car is provided to substitute for the person's feet, and multi-jointed robot arms are employed, in both of which seven or eight joints are connected. A pair of multi-jointed arms, a seat, and the chest and stomach of the robot are used to carry a person in care, and various carrying conditions are assumed, for example in which the person in care is held in a sideways position as depicted in FIG. 1A, in the robot's lap facing forwards as depicted in FIG. 1B, or further,, moved from this position by reclining and laid down. It is essential that a nursing robot handle a person gently, and drive control is required that is in keeping with the person's physical condition and whereby contact is not between both robot arms performing a variety of actions and the affected region of the person's body. The present inventors attempted to employ a pressure-sensitive matrix sheet sensor that is normally used as means for detecting pressure distribution, in the multi-jointed robot, as a sensor for detecting the contact state of the nursing robot. However, since the shape of the joint units of the multi-jointed robot is not that of a simple cylinder, both end portions thereof being shaped as an aperture that is inclined at a prescribed angle, it was not possible to detect the pressure distribution over the whole surface by means of a square matrix sheet sensor. Because the abovementioned cylindrical joint unit is in a wound-string shape, if the longest part of the tubular section is cut in the axial direction and extended by pushing, the present inventors sought to form the sheet sensor itself in a wound-string shape, to obtain a pressure-sensitive sheet sensor, in which the points of intersection of both sets of electrodes within the area of this wound-string shape are distributed uniformly, and to arrange the column electrodes in parallel and the row electrodes symmetrically with respect to the center constituted by central linear electrodes, such that, moving towards the outside, a wound-string shape results, which gradually becomes deeply concave at the central portion thereof.

Further, when conducting an experiment with the row electrodes of a conventional pressure-sensitive matrix sheet sensor modified so as to assume a wound-string shape, a nursing robot necessitates real-time, situation-dependant drive control. However, it takes a considerably long time to obtain pressure distribution through operation processing using values detected in a number of locations of intersection between column electrodes and row electrodes, and to perform suitable drive control of each joint based on contact information resulting from this processing. The problem of being unable to achieve the required real-time drive control has therefore become a pressing one. In fact, since this contact information is essential for the drive control of each joint at an appropriate offset angle, finely graded pressure distribution in the surface of the joint units is not absolutely necessary. Accordingly, consideration has been given to the fact that sampling of a predetermined number of the numerous column electrodes leads to a reduction in the volume of information. However, here, although the responsiveness was good, there was concern over the reliability of the pressure information, that is dependent on the detection signals from parts where electrodes intersect. Accordingly, the present inventors considered obtaining information on these areas from output signals from not one point of intersection but from a number of points of intersection in neighbouring areas. That does not constitute operation processing of signals from a number of points of intersection, but is a method of short-circuiting neighbouring electrodes and forming electrode groups, without this resulting in discarding signals from unsampled electrodes. With this construction, suppose that n column electrodes and m row electrodes are short-circuited, since the resistance values between these electrodes are constituted by resistances, of parts where n×m electrodes intersect, being connected in parallel, these resistances are present in resistance values in parts where n×m electrodes, in specific areas, intersect. The reliability of the information becomes high. Naturally, since this does not involve individually detecting the resistance values in the parts where n×m electrodes intersect, the operation processing load is the same as that in the previously mentioned case in which sampling is performed. This invention determines pressure distribution in particular areas, and although the position resolving power is imprecise up to the required level, the detection information is highly reliable in representing these areas. Hence, the technological significance of the invention lies in combining a high degree of reliability of information supplied and a quick response. Moreover, the method used may be a method involving α construction fulfilling the abovementioned requirements where, rather than forming the electrodes into a group, one wide electrode occupies the width of the group, and the whole of the area is detected as a signal representing the pressure, without a number of points of intersection being connected in parallel. However, ideally, it is preferable for the electrodes used to be linear and not wide, from the viewpoint of flexibility, since these pressure-sensitive sheet sensors are to be used for winding around cylindrical joints.

A multi-jointed mechanism for constructing a pair of arms for the nursing robot is shown in FIG. 2 and explained in detail here in below. FIG. 2A in the figure is an overview of the way in which the multiple joints are interconnected and a system for detecting contact information provided by each joint unit, for processing signals, and sending and receiving signals. The end on the left of the figure leads to the shoulder portion and the end on the right leads to the tip of the hand. The joint is made from a lightweight, hard raw material such as aluminum, and the angle of inclination is, for example, 45 degrees, or possibly 35 degrees. The shoulder in the main body of the robot is taken as the base portion and, using a fixed coordinate system, the positional relationship between each joint is acquired and managed. A network is formed from each of the joints, and a drive system with a servo motor at the center thereof is comprised in each joint. In addition, measuring means, in the form of a rotation speedometer, encoder, and the abovementioned pressure-sensitive sheet sensor for obtaining contact information, for example, are comprised. Information processing means such as a joint database, and a CD ROM and CPU for the operation thereof, are also provided, in addition to communication means for managing the network for information between the joints. FIG. 2A schematically shows only the pressure-sensitive sheet sensor P, encoder E, information processing means I and the signal lines L of the communication means, the drive system being omitted. Since the pressure distribution information obtained by pressure-sensitive sheet sensor P is equivalent to the information on the contact between the robot arms and the person in care, the relative position information in each joint is insufficient as-is, and, in operating the robot, the absolute position information from the perspective of the main body of the robot becomes necessary. In other words, because the pressure distribution information obtained in each joint is relative position information in each joint, position information must be acquired for the whole area of the pair of arms by converting this information in the fixed coordinate system that is based on the main body of the robot. In fact, an encoder E is provided in each joint, and, in addition to detecting the state in which the driven-side arm 7 in FIG. 7 is connected by an offset rotation joint offset by an offset angle γ with respect to the arm axis of drive-side arm 6, this information is communicated to adjacent joints, by signal lines passed through a slip ring 13, and a fixed coordinate system constituting the standard is configured such that this information is transmitted in sequence from the shoulder portion side joint. In other words, if an offset angle γ is supplied from the original information of the joint encoder, with respect to the fixed coordinate system of the main body of the robot, since the joint length information and tip portion inclination angle are already known, the position information, with respect to the fixed coordinate system, of this joint can be converted and ascertained. Based on the fixed coordinate system positional in a similar way using encoder information in this joint. By performing this coordinate conversion in each joint, in sequence, in the direction of the fingers, coordinate conversion is possible for all the joints. Consequently, although pressure distribution information obtained with pressure-sensitive matrix sheet sensors in individual joints is relative position information, if detection information from all of the joints is combined, it is possible to convert this information to the position information of the standard fixed coordinate system, in other words to absolute position information.

The central computer and network thereof for controlling each joint and the robot are shown schematically in FIG. 3. In the figure, Ei indicates the $i^{th}$ joint encoder, Pi the $i^{th}$ joint pressure-sensitive sheet sensor, and the full width characters "CPU" is the central computer, the half-width characters "CPU i" indicate the $i^{th}$ joint. As shown in FIG. 3A, upon collecting all the detection data from each joint in the CPU of the central computer and processing the abovementioned coordinate conversion, the CPU is overloaded and problems arise, namely that the required real-time processing becomes difficult. Then, as shown in FIG. 3B, a system was considered that separately provides a CPU-E dedicated to processing information from the encoder in the central computer, and a CPU-P dedicated to processing pressure-distribution information from the sheet sensor. Compared with the former method of collecting all the data in the CPU of the central computer and processing these data, the processing speed was moderately improved, yet not satisfactory.

Accordingly, in the present invention, a network system was considered, as shown in FIG. 3C, in which local processing in each of the joints is performed and the load in the central CPU is lightened. In other words, each joint comprises an encoder, and since joint length information and the tip portion inclination angle are already known, if this information is supplied with position information in the shoulder side joint, the position information for this joint can be locally processed, with the fixed coordinate system, in the same way as the shoulder side joint. In the light of this fact, if this processing is performed and the position information in the standard coordinate system is sent in sequence from the joint closest to the shoulder-side joint to the finger-side joint, it is possible for the position information in the standard coordinate system in this joint to be processed locally in all the joints. If the position information in the joint itself is known, it is possible to process and convert, in the standard coordinate system, the pressure distribution information obtained from the pressure-sensitive sheet sensor. This means that encoder information Ei and adjacent shoulder-side joint position information is input to the CPU i in each joint, and processing and conversion of the pressure distribution information in these joints to standard coordinate system information is performed. In this way, through the use of a construction that completes local processing, in each joint, of the operation for converting the pressure distribution information of a specific coordinate system obtained in each joint to a standard fixed coordinate system, the present invention lightens the load of the central computer, and the technological significance thereof lies in the fact that required real-time drive control is made possible.

In FIG. 2B is a cross-sectional view (cross-section though b—b of FIG. 2C) of a joint unit, and FIG. 2C is a perspective view of one part of the multi-jointed arm with the central joint unit cushioning outer shell cut away. As shown in FIGS. 2B and 2C, a pressure-sensitive matrix sheet sensor P is wound so as to cover the outer surface of the joint unit made from a material that is hard, such as metal. The signal output terminal T of the abovementioned sheet sensor P is inserted in and connected to connector C provided in the axial direction of the longest part of the joint tubular section. Although not shown, this connector C is connected via a switching circuit to information processing means I in the form of an 1C mounted within the joint. Furthermore, these information processing means I are connected to signal lines by which signals are to be sent and received. Also, in order to produce a gentle feel, the cushioning outer shell H, coming into direct contact with the person in care, is molded from a material that is soft and a poor thermal conductor, such as polyurethane foam.

Embodiment 1

FIG. 4 shows one embodiment of the pressure-sensitive matrix sheet sensor 1 of the present invention. FIG. 4A is a plan view thereof, FIG. 4B is a divided, cross-sectional view and FIG. 4C is a cross-sectional view. In this embodiment, an electrically conductive material such as copper is printed such that a multiplicity of linear column electrodes 2 are arranged in parallel on a column electrode side substrate material sheet 1 that is composed of polyester film, and such that a plurality of adjacent column electrodes 2 are connected in series. Furthermore, an electrically conductive material is printed such that a multiplicity of linear row electrodes 4 are arranged on a row electrode side substrate material sheet 5 composed of polyester film, symmetrically with respect to the center constituted by central linear electrodes, such that, moving towards the outside, a wound-string shape results, which gradually becomes deeply concave at the central portion thereof. A plurality of adjacent row electrodes 4 are thus also connected in series. A special-ink in which a metal powder is contained in a rubbery substance is applied and printed over the surfaces of both electrode substrate material sheets 1 and 5 printed with electrodes 2 and 4, and a pressure-sensitive resistive raw material 3 (a highly sensitive, electrically conductive elastomer) is stacked thereon. A pressure-sensitive matrix sheet sensor with a wound-string shape is manufactured by both sides of pressure resistant material of the electrode substrate material sheets being overlapped such that they join together. In this embodiment, by arranging ten of each of the column electrodes and row electrodes and serially connecting two adjacent electrodes, the whole area of the sheet is divided into 5×5 areas and the pressure distribution is obtained. Signal output terminals T are established so as to protrude from the sheet, and upon mounting the sheet onto the joint, this part is bent and inserted in connector C. For the joint control information, 5×5 is considered appropriate, however, the division of the sheet is by no means limited to this number. Moreover, if the number of electrodes is increased in accordance with the size of the joint, the number of electrodes to be connected may then be increased. In specific terms, since printing technology is used in the manufacture, it is possible for the configuration of electrodes on the substrate material sheet to be made with any equivalent design.

Embodiment 2

Limiting the volume of information to what is required, the present inventors proposed a structure in which column electrodes and row electrodes were configured in a zigzag shape across a prescribed width, as shown in FIG. 5, as means for obtaining information with a high degree of reliability. However, in the actual pressure-sensitive sheet sensor, row electrodes are arranged in a wound-string shape, however, for the sake of simplicity, FIG. 5A shows these row electrodes in a parallel arrangement. The special feature of this embodiment lies in the formation of the electrodes, as made explicit in FIG. 5B, whereby it is possible to cover an area of a prescribed width by a single electrode without connecting a plurality of electrodes. This embodiment also has a resolving power of 5×5 for the position information, and the resistances values, between specific column electrodes and specific row electrodes adopt a serially connected form in the 5×5 parts where electrodes intersect. The relationship is such that, if the width of the zigzag formed by the electrodes is made small, the number of electrodes becomes large, and the position resolving power grows large. If the pitch of the zigzag formed by the electrodes is made small, the number of points of intersection within specific areas becomes large, and a high degree of reliability of the signal for the detected pressure received results. The manufacture of this pressure-sensitive sheet sensor only differs in the electrode formation, and is not especially different from the previous embodiment.

The present invention employs a pressure-sensitive sheet sensor, in which column electrodes arranged in parallel on a sheet of substrate material, as well as row electrodes arranged, in a wound-string shape, on a sheet of substrate material, are overlapped, with pressure-sensitive resistive raw material interposed there between, the whole structure also being in a wound-string shape. Since this pressure-sensitive sheet sensor is wound around the outer surface of an arm constituted by multiple joints in which a plurality of joint units are serially connected and have a cylindrical, shape, both end portions of which are cut at an inclined angle, the points of intersection of both abovementioned sets of electrodes are distributed over the whole of the outer surface area of abovementioned joint units. The present invention is thus capable of dead-zone free pressure-distribution detection in the form of a pressure-distribution sensor for controlling a multi-jointed nursing robot.

Further, by making a pressure-sensitive matrix sheet sensor in which an electrode structure is adopted, in both the column direction and the row direction, capable of covering a prescribed width, the present invention made it possible to reduce the number of signal output terminals and lighten the information processing load, and, in addition, to make detection signals capable of representing these areas with a high degree of reliability, thus making it possible to combine a high degree of reliability of information supplied and a quick response.

Furthermore, in addition to each joint unit of the present invention comprising an encoder, pressure-sensitive sheet sensor and information processing means, each joint unit and the central control CPU were connected to a network, local operation processing was executed, in each of the joint units, by the use of the abovementioned information processing circuit, using the signals, output from the encoder and abovementioned pressure-sensitive sheet sensor, as well as using the shoulder side joint position information, and since this data was sent to the central CPU as standard coordinate system position information, it was possible to lighten the central CPU load and perform quick-response control in the form of a control system for the main body of the multi-jointed nursing robot.

What is claimed is:

1. A pressure-distribution sensor for controlling a multi-jointed nursing robot, wherein a pressure-sensitive sheet sensor, in which column electrodes arranged in parallel on a sheet of substrate material and row electrodes arranged in a wound-string shape also on a sheet of substrate material are overlapped with pressure-sensitive resistive raw material interposed there between, the pressure-sensitive sheet sensor being wound around the outer surface of an arm constituted by multiple joints in which a plurality of joint units having a cylindrical shape both end portions of which are cut at an inclined angle are serially connected, and wherein the points of intersection of both said electrodes are distributed over the whole of the outer surface area of said joint units, whereby it is possible to detect pressure distribution.

2. The pressure-distribution sensor for controlling a multi-jointed nursing robot according to claim 1, further including one or more signal output terminals and performing information processing, wherein, by short-circuiting a plurality of adjacent column electrodes in addition to short-circuiting a plurality of adjacent row electrodes, the number of signal output terminals is reduced and, in addition to the information processing operation load being lightened, detection of signals representing areas with a high degree of reliability is performed.

3. The pressure-distribution sensor for controlling a multi-jointed nursing robot according to claim 1, further including one or more signal output terminals and performing information processing, wherein, by combining column electrodes configured in a zigzag shape across a prescribed width with row electrodes also configured in a zigzag shape across a prescribed width, the number of signal output terminals is reduced and, in addition to the information processing load being lightened, detection of signals representing areas with a high degree of reliability is performed.

4. A multi-jointed nursing robot control system, wherein, in addition to each joint unit comprising a pressure-sensitive sheet sensor, an encoder and information processing means, each joint unit and a central control CPU are connected to a network, and local operation processing is executed for each of the joint units by said information-processing circuit, using signals output from said encoder and pressure-sensitive sheet sensor as well as from shoulder-side joint position information, these data being sent to the central CPU as reference coordinate system position information, whereby quick-response processing is performed.

* * * * *